(12) United States Patent
Hund et al.

(10) Patent No.: US 8,623,966 B2
(45) Date of Patent: Jan. 7, 2014

(54) PROCESS FOR PREPARING ACRYLAMIDE COPOLYMERS BY HOFMANN DEGRADATION REACTION

(75) Inventors: René Hund, Villars (FR); Christophe Auriant, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 158 days.

(21) Appl. No.: 13/124,672

(22) PCT Filed: Mar. 18, 2009

(86) PCT No.: PCT/FR2009/050456
§ 371 (c)(1),
(2), (4) Date: Apr. 18, 2011

(87) PCT Pub. No.: WO2010/061082
PCT Pub. Date: Jun. 3, 2010

(65) Prior Publication Data
US 2011/0263796 A1    Oct. 27, 2011

(30) Foreign Application Priority Data
Nov. 27, 2008  (FR) .................................... 08 58037

(51) Int. Cl.
*C08F 20/56*   (2006.01)
*C08F 8/00*    (2006.01)

(52) U.S. Cl.
USPC ...................................... 525/329.4; 525/369

(58) Field of Classification Search
USPC .............................. 525/329.4, 367, 371, 369
See application file for complete search history.

(56) References Cited

U.S. PATENT DOCUMENTS

| | | | | |
|---|---|---|---|---|
| 4,110,520 A | * | 8/1978 | Miyajima | ...................... 525/340 |
| 5,039,757 A | * | 8/1991 | Takaki et al. | .................. 525/343 |
| 2004/0118540 A1 | | 6/2004 | Garnier et al. | |
| 2010/0326614 A1 | * | 12/2010 | Hund et al. | ................. 162/164.6 |

FOREIGN PATENT DOCUMENTS

| | | |
|---|---|---|
| EP | 0377313 A2 | 7/1990 |
| WO | 2006/075115 A2 | 7/2006 |
| WO | 2008/107620 A2 | 9/2008 |

OTHER PUBLICATIONS

International Search Report for PCT/FR2009/050456, dated Jan. 9, 2009.

* cited by examiner

*Primary Examiner* — Ling Choi
*Assistant Examiner* — Chun-Cheng Wang
(74) *Attorney, Agent, or Firm* — Heslin Rothenberg Farley & Mesiti P.C.

(57) ABSTRACT

In a process for preparing cationic or amphoteric (co)polymers derived from acrylamide by a Hofmann degradation reaction in aqueous solution in the presence of an alkali and/or alkaline-earth metal hydroxide and an alkali metal hypohalide on a base copolymer, a solution of base copolymer on which the reaction is performed contains a polyvalent cationic salt representing at least 0.5% by weight, preferably from 2 to 10% by weight of the base copolymer.

20 Claims, No Drawings

PROCESS FOR PREPARING ACRYLAMIDE COPOLYMERS BY HOFMANN DEGRADATION REACTION

CROSS REFERENCE TO RELATED APPLICATIONS

This application is a national stage filing under section 371 of International Application No. PCT/FR2009/050456, filed on Mar. 18, 2009, and published in French on Jun. 3, 2010, as WO 2010/061082 and claims priority of French application No. 0858037 filed on Nov. 27, 2008, the entire disclosure of these applications being hereby incorporated herein by reference.

BACKGROUND ART

The invention relates to an improved process for preparing cationic or amphoteric acrylamide (co)polymers. More specifically, the invention relates to preparing cationic or amphoteric acrylamide (co)polymers by a degradation reaction called a Hofmann degradation in aqueous solution on a base (co)polymer and is characterized in that the reaction medium contains a high proportion of polyvalent cationic ions before reagents, i.e. hypohalide and hydroxide, are added.

The examples of cationic acrylamide polymers known in the prior art are of various kinds: most often they are copolymers based upon acrylamide and cationic monomers, which can also be polymers called Mannich polymers (the acrylamide polymer reacts with formaldehyde and a secondary amine then is quaternized), glyoxal polymers or acrylamide polymers on which a Hofmann degradation has been done.

Among all these polymers, only those obtained by a Hofmann degradation reaction have specific properties not shared in terms of cationic charge density.

Hofmann Degradation

This reaction, discovered by Hofmann at the end of the nineteenth century, can change an amide function into a primary amine function with elimination of a carbon atom. The reaction mechanism is given below.

In the presence of a base (e.g.: NaOH), a proton is removed from the amide.

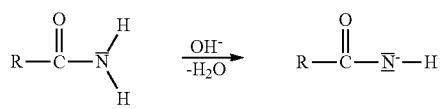

The amidate ion formed then reacts with the active chlorine ($Cl_2$) in hypochlorite (e.g.: NaClO, which is in equilibrium: $2NaOH+Cl_2 \leftrightarrow NaOCl+NaCl+H_2O$) to give an N-chloramide. The base (NaOH) removes a proton from the chloramide to form an anion. The anion loses a chloride ion to form a nitrene, which rearranges into an isocyanate.

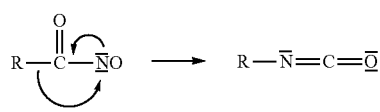

The hydroxide ion and the isocyanate react to form a carbamate.

After the carbamate is decarboxylated (removal of $CO_2$ in the presence of acid, e.g.: HCl), a primary amine is formed in the form of an acid salt.

To convert all or part of the amide functions of an acrylamide (co)polymer into amine functions, two main factors are involved (expressed in molar ratios). These are: —Alpha= (alkali and/or alkaline earth metal hypohalide/acrylamide) and—Beta=(alkali and/or alkaline earth metal hydroxide/alkali and/or alkaline earth metal hypohalide).

The polymers obtained by Hofmann degradation reaction are in particular used in paper-making processes. Generally, it is known that to be effective as a strength agent, the (co)polymers used must be in the most cationic form possible and therefore have a high degree of degradation. Indeed, as a function of the Alpha degree of degradation, it is possible to generate variations in cationicity related to the number of amine functions produced on the carbon backbone of the (co)polymer. Moreover, it is known that when the product obtained by Hofmann degradation reaction is amphoteric, it can also be used to improve the charge retention when the paper or cardboard is manufactured.

Until recently, only very expensive processes using, in situ, a Hofmann degradation product manufacturing unit (EP 377313) or processes using another polymer (base of the N-vinylformamide (co)polymer type followed by hydrolysis) itself relatively costly (US 2004/118540), had been implemented.

It was not until early 2005 and patent WO2006075115 by the applicant that a viable industrial solution was proposed. The invention there is characterized, in part, by the fact that the Hofmann degradation product claimed is an organic polymer produced at a concentration greater than 3.5% by weight and preferably greater than 4.5%. Even though the dry strength performance is greatly improved, the polymers produced remain unstable over time and have very low molecular weight, giving the (co)polymer very limited utility for applications such as draining or flocculation.

Patent WO2008/107620 by the applicant had resolved this problem of stability and poor performance during dewatering by changing the nature of the hypochlorite (using calcium hypochlorite). However, the inventor then had to handle low calcium hypochlorite availability, with high impurity content in the final product (the purest grade of calcium hypochlorite has a minimum level of impurities of 20%), and storage, transport and handling problems for a powder classed as dangerous.

The problem that the invention proposes solving is therefore to propose an improved process for preparing cationic or amphoteric acrylamide (co)polymers while retaining in said polymers their characteristics of stability and high molecular weight.

DESCRIPTION OF THE INVENTION

The Applicant has observed in a surprising manner that the advantages obtained according to patent WO2008/107620 can also be obtained by adding to the reaction medium, before adding the reagents, i.e. the hypohalide and the hydroxide, a significant quantity of polyvalent cationic ions. Further, this process presents the possibility of using a conventional hypochlorite, i.e. bleach, easily available on the market, containing fewer impurities and requiring simpler handling because it does not require direct contact with personnel (piping) and removing the constraining stage of pre-dissolving the solid calcium hypochlorite.

The applicant has found and developed a process for preparing cationic or amphoteric (co)polymers derived from acrylamide by a Hofmann degradation reaction in aqueous solution in the presence of an alkali and/or alkaline-earth metal hydroxide and an alkali metal hypohalide on a base copolymer, characterized in that the solution of base copolymer onto which the reaction is performed contains a polyvalent cationic salt representing at least 0.5% by weight, preferably from 2 to 10% by weight of the base copolymer.

Since these products are known in the prior art for their instability at Alpha coefficients less than 1, it could not therefore be presumed that simply adding a polyvalent cationic ion salt could give the cationic (co)polymer derived from acrylamide obtained according to the invention:
not only very high stability over time,
but also high viscosity greater than 30 cps (at a concentration of 9%, at 25° C., Brookfield LV1, 60 rpm), preferably greater than 40 cps.

As already stated, the copolymer obtained by a Hofmann degradation reaction must be obtained in whole or in part in the presence, as hypohalide, of an alkali metal hypohalide.

In a preferred embodiment, the copolymer is obtained by a Hofmann degradation reaction in the exclusive presence, as hypohalide, of an alkali metal hypohalide, advantageously sodium hypochlorite.

Without attempting to establish any theory, it seems that the mere presence of salts of polyvalent cationic ions in the solution of base (co)polymer during the Hofmann degradation reaction might limit the sensitivity of the polymer chain inherent to the conditions of the Hofmann degradation reaction, thereby preserving its molecular weight and stability.

According to another characteristic, the hypohalide/non-ionic monomer Alpha coefficient used to prepare the polymers of the invention is greater than 0.1, preferably than 0.3, advantageously greater than 0.5 and preferably less than 1.

The copolymer obtained according to the invention can be used successfully to manufacture packaging paper and cardboard, coating papers, all types of paper, cardboard or analogues needing the use of a polymer cationic and as coagulation agent.

According to another characteristic, the product of the Hofmann degradation is produced at a concentration greater than 4% by weight, preferably greater than 8%, advantageously greater than 9%.

In the same way, the copolymer of the invention has a cationic charge density preferably greater than 2 meq/g and advantageously greater than 5 meq/g.

The Cationic or Amphoteric (Co)Polymer Derived from Acrylamide

It is obtained by Hofmann degradation reaction on a base (co)polymer.

The "Base" Copolymer

In practice, the base polymer used consists:
of at least one non-ionic monomer selected from the group comprising acrylamide (and/or methacrylamide), N,N dimethylacrylamide and/or acrylonitrile, preferably acrylamide, advantageously at least 5 mol % of said monomer,
optionally of at least:
one cationic unsaturated ethylenic monomer, selected preferably from the group comprising monomers of the dialkylaminoalkyl(meth)acrylamide, diallylamine, methyldiallylamine type, and salts of quaternary ammonium or acids thereof. In particular dimethyldiallylammonium chloride (DADMAC), acrylamidopropyltrimethylammonium chloride (APTAC) and/or methacrylamidopropyltrimethylammonium chloride (MAPTAC) will be cited,
and/or a non-ionic monomer selected preferably from the group comprising N-vinyl acetamide, N-vinyl formamide, N-vinylpyrrolidone and/or vinyl acetate,
and/or an anionic monomer of the acid or anhydride type selected from the group comprising (meth)acrylic acid, acrylamidomethylpropane sulfonic acid, itaconic acid, maleic anhydride, maleic acid, methallyl sulfonic acid, vinyl-sulfonic acid and <50 mol % salts thereof.

Advantageously, the base polymer consists preferably:
of acrylamide,
and at least one cationic unsaturated ethylenic co-monomer, selected from the group comprising monomers of the dialkylaminoalkyl(meth)acrylamide, diallylamine, methyldiallylamine type, and quaternary ammonium or acid salts thereof, preferably dimethyldiallyl ammonium chloride.

It is important to note that, in combination with these monomers, it is also possible to use monomers that are insoluble in water such as acrylic, allyl or vinyl monomers containing a hydrophobic substituent. When they are used, these monomers will be used in very low quantities, less than 20 mol %, preferably less than 10 mol %, and they will be selected preferably from the group comprising derivatives of acrylamide such as N-alkylacrylamide, for example N-tert-butylacrylamide, octylacrylamide and N,N-dialkylacrylamides such as N,N-dihexylacrylamide, etc. and derivatives of acrylic acid such as alkyl acrylates and methacrylates, etc.

According to a preferred feature of the invention, the base copolymer is branched.

The branching can be done preferably during (or optionally after) the polymerization of the "base" copolymer, in the presence of a polyfunctional branching agent and optionally a transfer agent. Below is found a non-limiting list of branching agents: methylene bisacrylamide (MBA), ethylene glycol diacrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxys or any other means of cross-linking known to the skilled person.

In practice, the branching agent is methylene bis acrylamide (MBA), added advantageously at from five to fifty thousand (5 to 50,000) parts per million by weight, preferably 5 to 10,000, advantageously from 5 to 5,000. Advantageously, the branching agent is methylene bis acrylamide (MBA).

Below is found a non-limiting list of transfer agents: isopropyl alcohol, sodium hypophosphite, mercaptoethanol, etc.

The skilled person will know how to select the best combination as a function of his own understanding and the present description, along with the examples that follow.

The copolymer serving as base for the Hofmann degradation reaction does not need any specific polymerization process development. The main polymerization techniques, well known to the skilled person and that can be used are: polymerization by precipitation, polymerization in emulsion (aqueous or inverse) with or without a subsequent distillation and/or spray drying step, and polymerization in suspension or polymerization in solution, these two techniques being preferred.

This base is characterized in that it has a molecular weight greater than 5,000 g/mol and without a maximum limit.

It is also possible to add to the base copolymer solution, before or during the Hofmann degradation reaction, a number of additives that can react on the isocyanate functions of the polymer generated during the degradation. Generally, this is molecules carrying nucleophilic chemical functions such as hydroxyl, amine, etc. functions. As examples, the additives in question can therefore be from the family of alcohols, polyols (e.g.: starch), polyamines, polyethylene imines, etc.

Before being degraded, according to the invention one (or more) salts of polyvalent cationic ions (i.e. with cationic charge greater than or equal to 2) are incorporated into the base copolymer solution, at a minimum concentration of 0.5% by mass, preferably from 2-10% by mass, compared with the base (co)polymer. Among the salts of polyvalent cationic ions that can be used divalent ions are preferred, preferably $Ca^{++}$, $Mg^{++}$, $Zn^{++}$, $Cu^{++}$, and/or $Ba^{++}$ and/or $Al^{+++}$ ions. It has also been found that trivalent salts such as aluminium could be of interest.

These salts are preferably in the form of halide, sulfate, carbonate, nitrate, phosphate, nitrite, citrate or even acetate. Advantageously, the salts of polyvalent cationic ions are added to the solution of base (co)polymer after polymerization. In a non-preferred variant of the invention, these salts can also be incorporated before or during the polymerization of the base (co)polymer.

Hofmann Degradation Reaction on the "Base" Copolymer

The Hofmann reaction requires conversion of amide functions into amine functions using two main factors (expressed as molar ratios):

Alpha=(alkali metal hypohalide/(meth)acrylamide)
Beta=(alkali and/or alkaline-earth metal hydroxide/alkali metal hypohalide)

From a solution of "base" copolymer previously described having concentration from 10 to 40% by weight, preferably between 20 and 40%, the molar quantity of total (meth) acrylamide functions is determined. The level of Alpha degradation desired is selected (this corresponds to the desired degree of amine functions), which determines the dry quantity of alkali metal hypohalide and then the beta coefficient, which determines the dry quantity of alkali and/or alkaline earth metal hydroxide.

Next a solution of alkali and/or alkaline earth metal hypohalide and hydroxide is prepared from the alpha and beta ratios. According to the invention, the reagents preferably used are sodium hypochlorite (bleach) and caustic soda (sodium hydroxide).

To stabilize the amine functions that will be produced, one (or optionally more) quaternary ammonium derivatives can optionally be added to the reactor containing the base polymer, as is described in patent JP 57077398 and well known to the skilled person, which is to prevent reaction between the amine functions and the residual amide functions.

It should also be noted that these agents can be added separately, simultaneously, in mixtures or not, in any order of addition and at one or more injection points.

The increase in cationicity in the base copolymer occurs during the Hofmann degradation, through the use, completely or partially, of an alkali metal hypohalide.

Furthermore, it is also possible to propose cationic or amphoteric copolymers of acrylamide of the invention obtained by Hofmann degradation reaction in the form of a mixture with one or more other synthetic polymer(s) with higher molecular weights and preferably non-ionic or cationic charge.

In the same way, although prepared in solution, the polymers of the invention can also be proposed in solid form. Under these conditions, the solid form contains not only the copolymer, but also a small proportion of salt obtained from the Hofmann degradation reaction. In practice, they are obtained among others, by processes consisting in isolating the active matter from the previously cited solution. The main isolation techniques used are those of drying by atomization or spraying (which consists in creating a cloud of fine droplets in a hot gaseous current for a controlled period), drying in a drum, fluid bed dryers, etc.

As already stated, the copolymers obtained according to the process of the invention find more specific application in processes for manufacturing paper for their properties of dewatering, charge retention and/or to improve dry strength performance.

The following examples illustrate the invention without limiting its scope.

EXAMPLES

Example 1

Cationic Copolymer Derived from Acrylamide

A cationic (co)polymer derived from acrylamide was obtained by Hofmann degradation reaction on a base copolymer of acrylamide and dimethyldiallyl ammonium chloride (DADMAC) branched (MBA: 600 ppm with respect to the active matter) in aqueous solution at 25% concentration (viscosity: 3000 cps).

In this solution of base polymer is previously dissolved a calcium salt in the form of calcium chloride ($CaCl_2$) at 2% by weight with respect to the base copolymer.

The degradation reaction is done on the solution prepared accordingly at the temperature of 25° C. using sodium hypochlorite and sodium hydroxide in the proportions required to deliver a partial alpha (0.7).

The intermediate product obtained is then decarboxylated in an excess of hydrochloric acid then the pH adjusted with sodium hydroxide (to the order of 4).

The cationic (co)polymer derived from acrylamide accordingly made has a bulk viscosity of 85 cps (at 25° C., Brookfield LV1, 60 rpm) and a concentration of 10%. It passes the stability test (set out in patent WO 2008/107620) and presents improvements in CSF comparable to the products in patent WO 2008/107620.

Example 2

Amphoteric Copolymer Derived from Acrylamide

An amphoteric (co)polymer derived from acrylamide was obtained by a Hofmann degradation reaction on a branched (MBA: 300 ppm/active matter) base copolymer of acrylamide, dimethyldiallyl ammonium chloride (DADMAC) and acrylic acid in aqueous solution at 25% concentration (viscosity: 3500 cps).

In this solution of base polymer is previously dissolved a calcium salt in the form of calcium chloride ($CaCl_2$) at 2% by weight with respect to the base copolymer.

The degradation reaction is done on the solution prepared accordingly at the temperature of 25° C. using sodium hypochlorite and sodium hydroxide in the proportions required to deliver a partial alpha (0.7).

The intermediate product obtained is then decarboxylated in an excess of hydrochloric acid then the pH adjusted with sodium hydroxide (to the order of 4).

The amphoteric (co)polymer derived from acrylamide made accordingly has a bulk viscosity of 38 cps (at 25° C., Brookfield LV1, 60 rpm), a concentration of 10% and also passes the stability test as set out in example 1.

The invention claimed is:

1. A process for preparing cationic or amphoteric (co)polymers derived from acrylamide by a Hofmann degradation reaction in aqueous solution in the presence of an alkali and/or alkaline-earth metal hydroxide and an alkali metal hypohalide on a base copolymer, comprising: providing a solution containing a base copolymer representing from 10 to 40% by weight, of the solution, and a polyvalent cationic salt representing from 0.5 to 10% by weight, of the base copolymer, and performing the reaction on the solution of base copolymer.

2. The process according to claim 1, wherein the alkali metal hypohalide comprises exclusively sodium hypochlorite.

3. The process according to claim 1, wherein the polyvalent cationic ion salts are selected from the group consisting of: salts of Ca++, Mg++, Zn++, Cu++, Ba++ and Al+++ ions.

4. The process according to claim 1, wherein the salts of polyvalent cationic ions are selected from the group consisting of: halide, sulfate, carbonate, nitrate, phosphate, nitrite, citrate and acetate salts.

5. The process according to claim 1, wherein salts of polyvalent cationic ions are added to the solution of base copolymer after polymerization.

6. The process according to claim 1, wherein the base polymer comprises:
at least one non-ionic monomer selected from the group consisting of: acrylamide, methacrylamide, N,N dimethylacrylamide and acrylonitrile.

7. The process according to claim 1, wherein the base polymer consists of:
acrylamide,
and at least one cationic unsaturated ethylenic monomer, selected from the group consisting of: monomers of dialkylaminoalkyl(meth)acrylamide, diallylamine, methyldiallylamine, and quaternary ammonium or acid salts thereof.

8. The process according to claim 1, wherein the base copolymer is branched during or after its polymerization, in the presence of a polyfunctional branching agent.

9. The process according to claim 1, wherein the product of the Hofmann degradation reaction is produced at a concentration greater than 4% by weight.

10. The process according to claim 1, wherein said cationic or amphoteric (co)polymers derived from acrylamide are obtained at a concentration greater than 4% by weight.

11. The process according to claim 1, wherein said cationic or amphoteric (co)polymers derived from acrylamide have a cationic charge density greater than 2 meq/g.

12. The process according to claim 1, wherein the solution of base copolymer contains a polyvalent cationic salt representing from 2 to 10% by weight, of the base copolymer.

13. The process according to claim 6, wherein the base polymer further comprises at least:
one cationic unsaturated ethylenic monomer, selected from the group consisting of monomers of the dialkylaminoalkyl(meth)acrylamide, diallylamine, methyldiallylamine, and their quaternary ammonium or acid salts thereof,
and/or a non-ionic monomer selected from the group consisting of N-vinyl acetamide, N-vinyl formamide, N-vinylpyrrolidone and/or vinyl acetate,
and/or an anionic monomer of the acid or anhydride selected from the group consisting of (meth)acrylic acid, acrylamidomethylpropane sulfonic acid, itaconic acid, maleic anhydride, maleic acid, methallyl sulfonic acid, vinyl-sulfonic acid and <50% molar salts thereof.

14. The process according to claim 7, wherein the at least one cationic unsaturated ethylenic monomer comprises dimethyldiallyl ammonium chloride.

15. The process according to claim 8, wherein the base copolymer is branched during or after its polymerization, in the presence of a polyfunctional branching agent and a transfer agent.

16. The process according to claim 9, wherein the product of the Hofmann degradation reaction is produced at a concentration greater than 8% by weight.

17. The process according to claim 16, wherein the product of the Hofmann degradation reaction is produced at a concentration greater than 9% by weight.

18. The process according to claim 10, wherein said cationic or amphoteric (co)polymers derived from acrylamide are obtained at a concentration greater than 8% by weight.

19. The process according to claim 18, wherein said cationic or amphoteric (co)polymers derived from acrylamide are obtained at a concentration greater than 9% by weight.

20. The process according to claim 11, wherein said cationic or amphoteric (co)polymers derived from acrylamide have a cationic charge density greater than 5 meq/g.

* * * * *